United States Patent [19]
Masumoto et al.

[11] Patent Number: 5,638,908
[45] Date of Patent: Jun. 17, 1997

[54] APPARATUS FOR ADJUSTING BETWEEN CRAWLER TRACKS OF A WORKING VEHICLE

[75] Inventors: Masao Masumoto; Shizuo Shimoie, both of Sakai, Japan

[73] Assignee: Kubota Corporation, Osaka, Japan

[21] Appl. No.: 410,521

[22] Filed: Mar. 27, 1995

[30] Foreign Application Priority Data

Sep. 9, 1994 [JP] Japan ................................ 6-216067
Nov. 1, 1994 [JP] Japan ................................ 6-267940

[51] Int. Cl.$^6$ ................................ E02F 3/76; B25J 5/00
[52] U.S. Cl. .................. 172/815; 172/827; 280/638; 180/9.48
[58] Field of Search ................... 172/786, 787, 172/815, 827, 795; 280/638; 180/9.48

[56] References Cited

U.S. PATENT DOCUMENTS

| | | | |
|---|---|---|---|
| 2,681,231 | 6/1954 | Kondracki | 280/638 |
| 2,763,330 | 9/1956 | Potter | 280/638 |
| 3,494,439 | 2/1970 | Kline | 180/9.48 |
| 3,712,398 | 1/1973 | Althaus | 180/9.48 |
| 3,820,616 | 6/1974 | Juergens | 180/9.48 |
| 3,894,598 | 7/1975 | Yeou | 280/638 |
| 3,998,286 | 12/1976 | Pnikelsky et al. | 280/638 |
| 4,132,317 | 1/1979 | Arendt et al. | 180/9.48 |
| 4,369,847 | 1/1983 | Mizinuma | 172/815 |
| 4,830,562 | 5/1989 | Frederking | 180/9.48 |
| 5,282,644 | 2/1994 | Larson | 280/638 |
| 5,451,135 | 9/1995 | Schempf et al. | 180/9.48 |

FOREIGN PATENT DOCUMENTS

| | | |
|---|---|---|
| 2064459 | 7/1971 | France . |
| 9319382.3 | 4/1995 | Germany . |
| 5-331877 | 12/1993 | Japan . |

*Primary Examiner*—Terry Lee Melius
*Assistant Examiner*—Christopher J. Novosad
*Attorney, Agent, or Firm*—Hazel & Thomas, P.C.

[57] ABSTRACT

An apparatus for adjusting spacing between a pair of crawler tracks of a working vehicle such as a backhoe. This apparatus is capable of moving the crawler tracks independently of each other. When one of the crawler tracks is moved laterally outwardly of the vehicle, the other may be maintained in an inward position.

5 Claims, 6 Drawing Sheets

APPARATUS FOR ADJUSTING BETWEEN CRAWLER TRACKS OF A WORKING VEHICLE

BACKGROUND OF THE INVENTION

1. Field of the Invention

The present invention relates to an apparatus for adjusting spacing between endless or crawler tracks of a working vehicle having a backhoe implement or the like.

2. Description of the Prior Art

A conventional working vehicle having right and left crawler tracks is disclosed in Japanese Patent Publication Kokai No. 5-331877, for example. These crawler tracks are movable by the same amount toward and away from the longitudinal centerline of the working vehicle. In this type of working vehicle, both of the crawler tracks are moved toward the centerline even when it is desired to move only one of the crawler tracks toward the centerline.

Where, for example, a backhoe, which is one type of working implement, is used to dig earth adjacent a wall, the swivel deck should be placed as close to the wall as possible to dig earth adjacent the wall. Thus, a digging operation is started after the working vehicle is placed parallel and close to the wall in order to move the swivel deck as close to the wall as possible.

However, with the above conventional construction, an operation to vary the spacing between the right and left crawler tracks causes both of the crawler tracks to move by the same amount relative to the centerline. When the crawler track opposed to the wall is moved toward the centerline, the caterpillar track remote from the wall will also be moved by the same amount toward the centerline.

As a result, the spacing between the right and left crawler tracks will become small. In some cases, a better balance is desired when the swivel deck is turned to direct the backhoe implement to a truck or the like parked in a position opposite the wall across the working vehicle, to load the truck with earth.

SUMMARY OF THE INVENTION

An object of the present invention is to provide a working vehicle with right and left crawler tracks controllable independently of each other such that, when one of the crawler tracks is moved toward a longitudinal centerline of the vehicle, the other crawler track may be left in a position remote from the centerline, thereby securing a better balance than in the prior art.

The above object is fulfilled, according to the present invention, by a working vehicle having a centerline extending longitudinally thereof, comprising a chassis frame, a swivel deck rotatably supported by the chassis frame, a right crawler track and a left caterpillar track supported by the chassis frame, a right actuator for moving the right crawler track toward and away from the centerline, and a left actuator operable independently of the right actuator for moving the left crawler track toward and away from the centerline.

With this construction, when one of the crawler tracks is moved toward the centerline, the other may be maintained in a position remote from the centerline. Thus, a better balance may be secured than in the prior art in which both crawler tracks must be moved.

Further and other objects, features and effects of the invention will become more apparent from the following more detailed description of the embodiments of the invention taken with reference to the accompanying drawings.

DETAILED DESCRIPTION OF THE PREFERRED EMBODIMENTS

An embodiment of the present invention will be described hereinafter with reference to the drawings.

Figure 1:
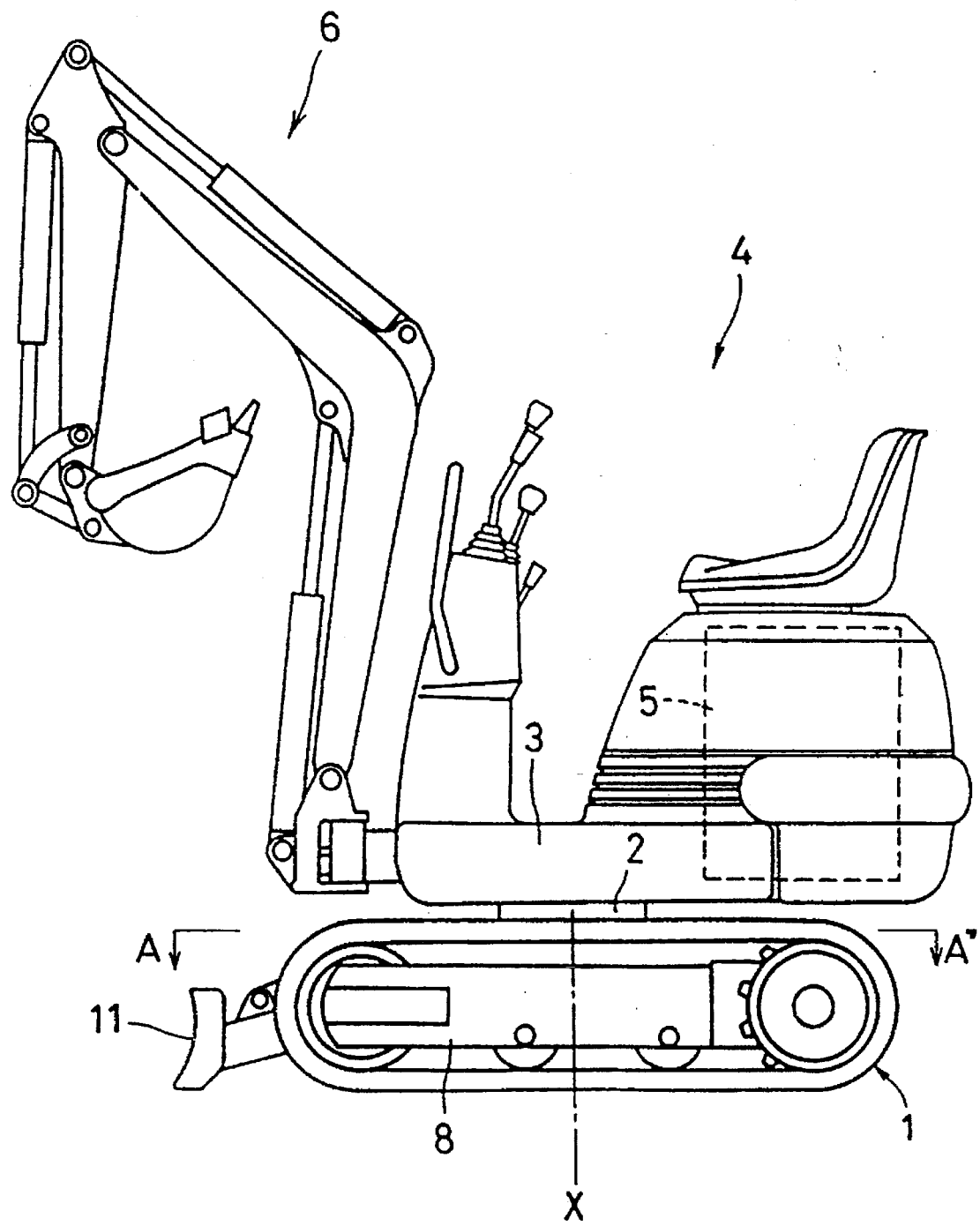
FIG. 1 is a side elevation of a working vehicle having a backhoe implement according to the present invention.

FIG. 1 shows a backhoe as one example of working vehicles. This backhoe includes right and left crawler tracks 1 supported by a chassis frame 2, with a swivel deck 3 rotatable about a vertical axis X. The swivel deck 3 has, mounted thereon, a driver's section 4, a motor section 5, and a backhoe implement 6 swingable horizontally. A dozer implement 11 is attached to the chassis frame 2. As used hereinafter, the terms "longitudinal" and "transverse" refers to such directions with respect to the backhoe.

Figure 2:
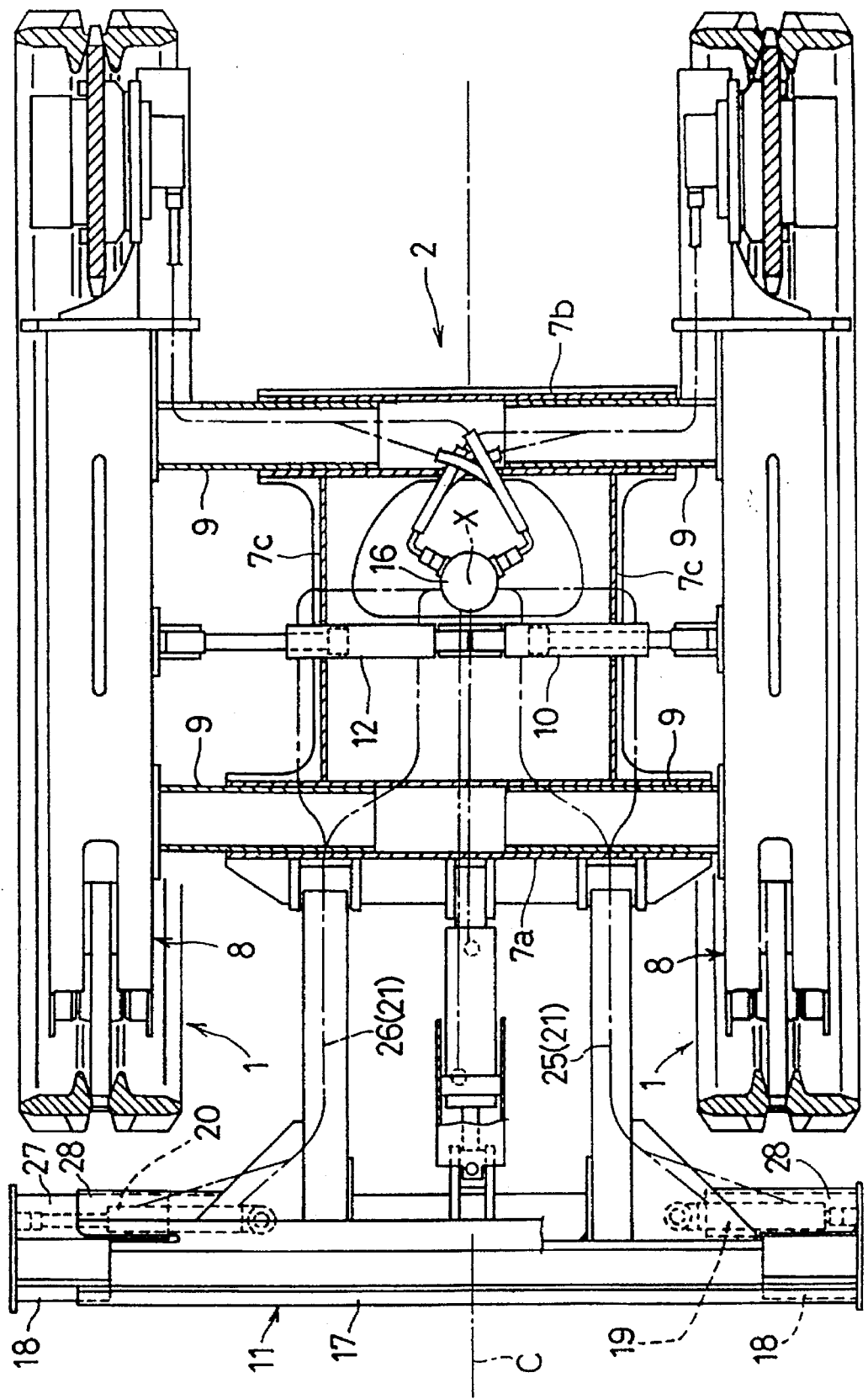
FIG. 2 is a section taken on line A-A' of FIG. 1.

In FIG. 2, the downward direction corresponds to the forward direction of the working vehicle. The longitudinal centerline of the working vehicle is shown in a broken line C.

As shown in FIG. 2, the chassis frame 2 includes support frames 7a and 7b formed of square pipes and extending transversely of the working vehicle. These support frames 7a and 7b are longitudinally spaced from each other and interconnected through a pair of flames 7c extending longitudinally. The left crawler track 1 has a track frame 8 extending longitudinally. Two transverse frames 9 are attached to forward and rearward positions of the track frame 8. These transverse frames 9 are formed also of square pipes and extend toward the centerline C of the working vehicle. Distal ends of the transverse frames 9 extend into the support flames 7a and 7b, respectively. Thus, the transverse frames 9 are supported in the support frames 7a and 7b to be transversely slidable relative thereto. The right crawler track 1 also has a track frame 8, with transverse frames 9 attached to forward and rearward positions of the track frame 8. These transverse frames 9 are formed also of square pipes and have distal ends fitted in the support frames 7a and 7b to be transversely slidable relative thereto.

Spacing between the left and right crawler tracks 1 is variable by a hydraulic cylinder 10 acting as an extendible and retractible left actuator and a hydraulic cylinder 12 acting as a right actuator. These hydraulic cylinders 10 and 12 are arranged between and extend substantially parallel to the front and rear support frames 7a and 7b. With one hydraulic cylinder 10 or 12 provided for each of the left and right crawler tracks 1, the crawler tracks 1 are transversely movable independently of each other relative to the chassis frame 2. Each of the left and right hydraulic cylinders 10 and 12 is pivotally connected at opposite ends thereof to the track frame 8 and chassis frame 2. In FIG. 2, the right crawler track 1 is remote from the centerline C, and the left caterpillar track 1 is at a minimum distance to the centerline C. In this construction, the centerline C and vertical axis X cross each other. Thus, the crawler tracks 1 are in the same positions relative to the centerline C as relative to the vertical axis X.

Figure 4:
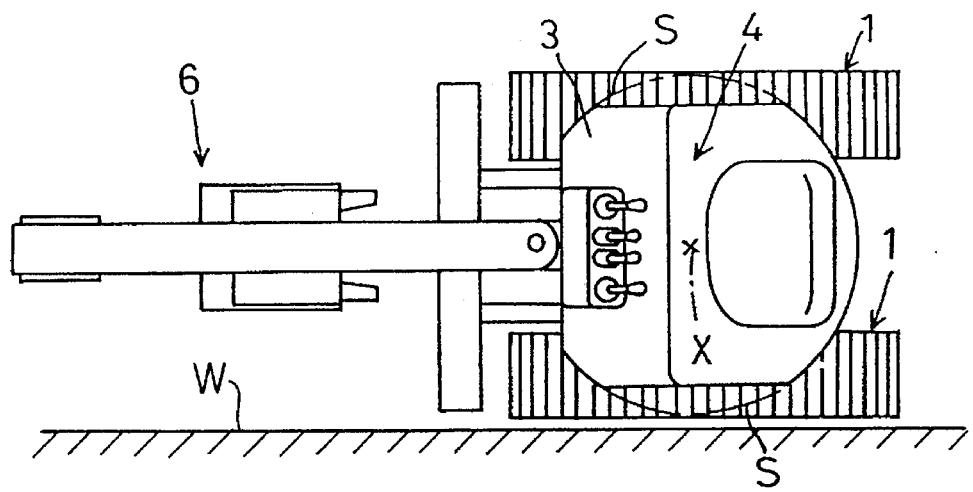
FIG. 4 is a plan view showing the working vehicle parked adjacent a wall.

As shown in FIG. 4, the swivel deck 3 has a locus of rotation S of its peripheries substantially inscribed in outer lateral edges of the right and left crawler tracks 1 at the minimum distance to the vertical axis X.

Figure 5:
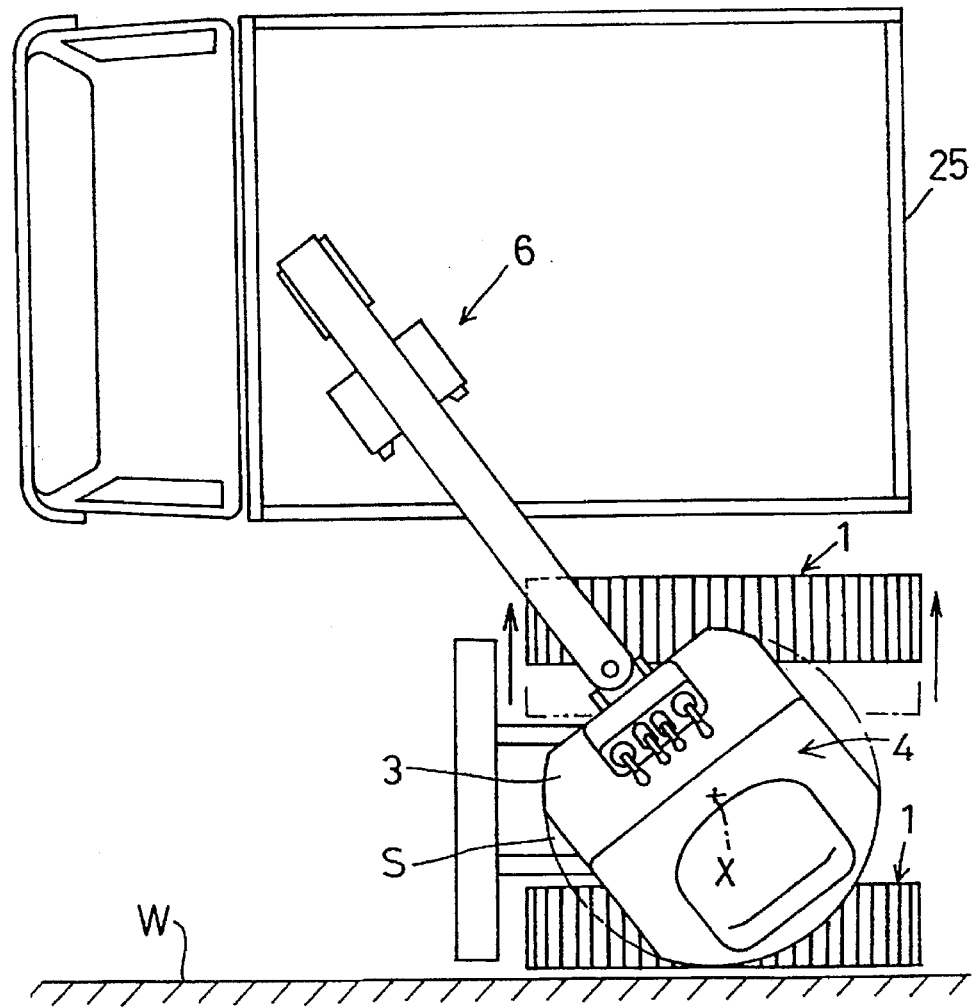
FIG. 5 is a plan view showing the working vehicle engaging in an operation adjacent the wall.

In the above construction, the right and left crawler tracks 1 are transversely movable independently of each other relative to the chassis frame 2. Consequently, when digging earth adjacent a wall W opposed to one of the crawler tracks 1, as shown in FIG. 5, only the crawler track 1 opposed to the wall W may be moved toward the vertical axis X, without moving the other crawler track 1 toward the vertical axis X. A digging operation may be carried out with the former disposed closer than the latter to the vertical axis X. The digging operation may be effected right next to the wall since the locus of rotation S of the peripheries of the swivel deck 3 is substantially inscribed in the outer lateral edges of the right and left crawler tracks 1 at the minimum distance to the vertical axis X (see FIG. 4).

The digging operation may be carded out next to the wall with the right and left crawler tracks 1 spaced apart from each other. This maintains a good balance of the vehicle when the swivel deck 3 is turned to direct the backhoe implement 6 to a truck 25 parked in a position opposite the wall W across the vehicle, to load the truck 25 with earth.

Figure 6A:
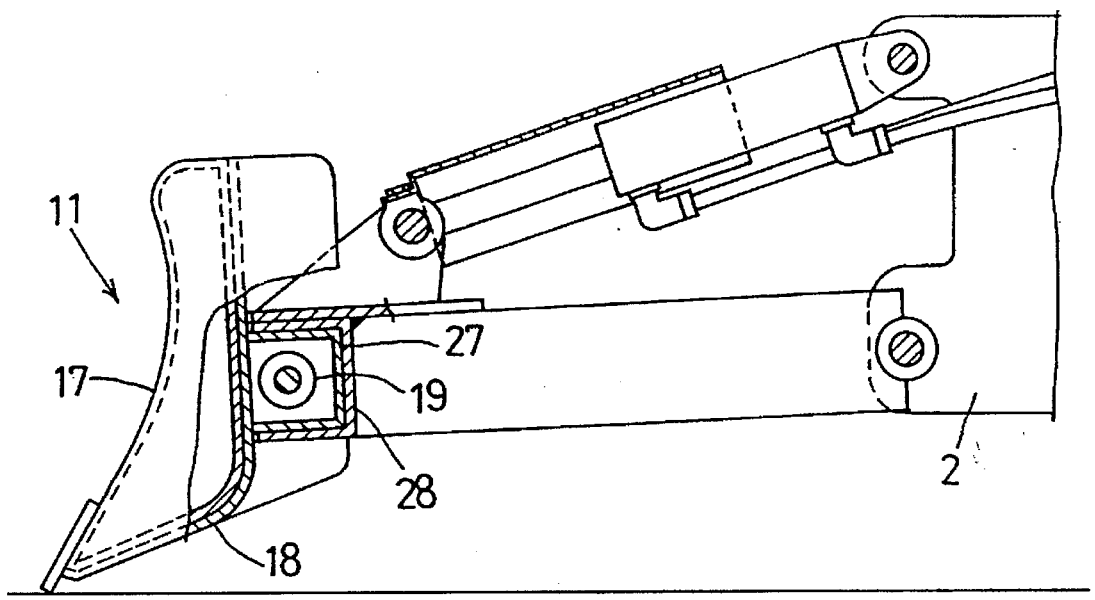
FIGS. 6A and 6B are sectional side views showing a dozer implement according to the present invention.
Figure 6B:
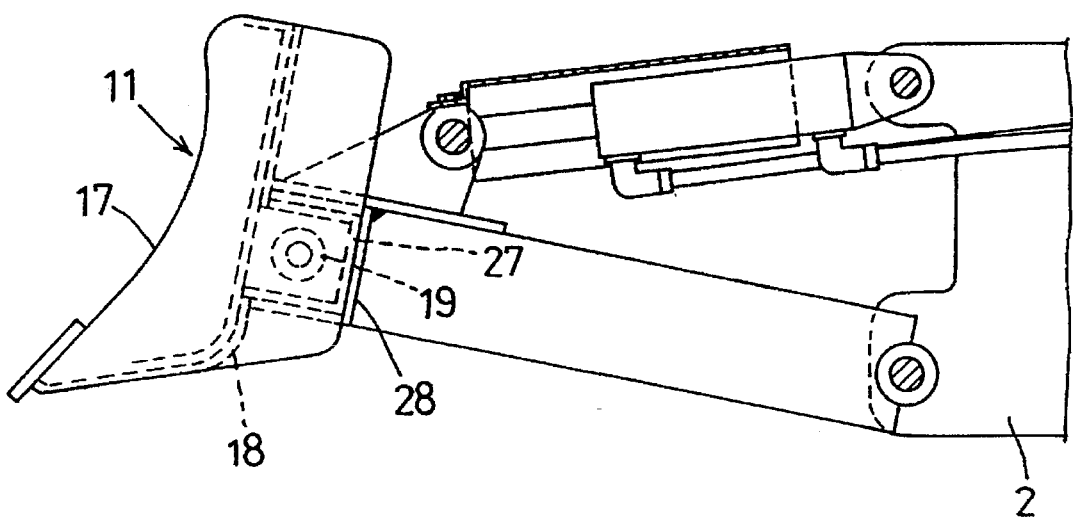

As shown in FIGS. 2, 6A and 6B, the dozer implement 11 includes a main dozer 17, and auxiliary dozers 18 provided for right and left ends of the main dozer 17 to be slidable transversely of the working vehicle. Hydraulic cylinders 19 and 20 extend transversely behind the opposite ends of the main dozer 17 for driving the auxiliary dozers 18, respectively. The auxiliary dozers 18 are extendible and retractable relative to the main dozer 17, so that the dozer implement 11 is adjustable to a width substantially corresponding to that of the crawler tracks 1.

The auxiliary dozers 18 are arranged to overlap the main dozer 17 from behind. The hydraulic cylinders 19 and 20 have pistons connected at distal ends thereof to extension edges at outer lateral ends of the auxiliary dozers 18, respectively. The hydraulic cylinders 19 and 20 are surrounded by square guide pipes 27 attached to rear positions of the auxiliary dozers 18. These guide pipes 27 are slidably mounted in square guide pipes 28 attached to rear positions of the main dozer 17.

Figure 3:
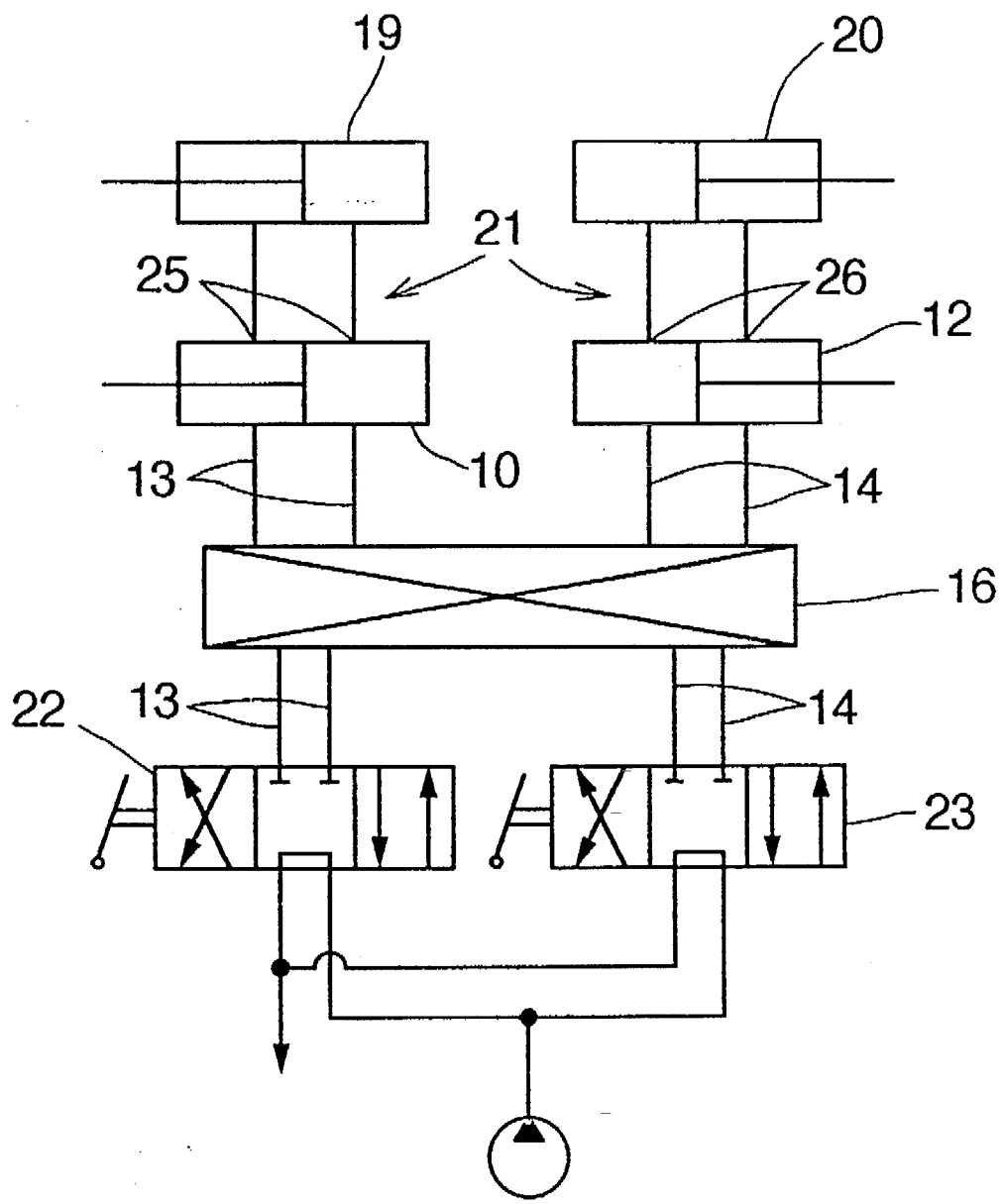
FIG. 3 is a diagram of a hydraulic circuit for controlling spacing between caterpillar tracks according to the present invention.

As shown in FIG. 3, each of the left and right hydraulic cylinders 10 and 12 has a pair of oil supply and exhaust lines 13 or 14 extending from an oil pump (not shown) in the motor section on the swivel deck 3 through a rotary joint 16 to the chassis frame 2. The supply and exhaust lines 13 am connected to a left control valve 22, while the supply and exhaust lines 14 are connected to a right control valve 23.

A synchronous driving device 21 is provided for each side for synchronously driving the hydraulic cylinder and auxiliary dozer driving hydraulic cylinder on the same, right or left, side. The synchronous driving devices 21 include oil supply and exhaust ports 25 interconnecting the left auxiliary dozer driving hydraulic cylinder 19 and left hydraulic cylinder 10, and oil supply and exhaust ports 26 interconnecting the right auxiliary dozer driving hydraulic cylinder 20 and right hydraulic cylinder 12.

According to the above construction, the left and right auxiliary dozer driving hydraulic cylinders 19 and 20 are operable to extend and retract the auxiliary dozers 18 independently of each other relative to the main dozer 17. In addition, the crawler driving hydraulic cylinder and auxiliary dozer driving hydraulic cylinder on the same side are driven synchronously by the synchronous driving device 21. An operation to extend the dozer implement 11 is simpler than in the prior art, since this is be effected only by driving the crawler driving hydraulic cylinders 10 and 20.

The auxiliary dozer driving hydraulic cylinders 19 and 20 are driven through oil supply and exhaust hoses extending from the oil supply and exhaust ports 25 and 26 of the hydraulic cylinders 10 and 12 rather than the rotary joint 16. This is effective in avoiding the use of a complicated accommodating structure, compared with the case of hydraulic hoses being present between the auxiliary dozer driving hydraulic cylinders 19 and 20 and the rotary joint 16.

The construction for extending and retracting the auxiliary dozers 18 relative to the main dozer 17 is not limited to the foregoing embodiment. For example, the auxiliary dozers 18 may be attached to the opposite ends of the main dozer 17 to be pivotable back and forth about vertical axes, respectively. Then, the auxiliary dozers 18 are switchable between forward positions extending along the main dozer 17 to extend the dozer implement 11 transversely of the working vehicle, and rearward positions folded behind the main dozer 17 to diminish the dozer implement 11 transversely.

The crawler tracks 1 may be adapted transversely movable relative to the chassis frame 2 through pantograph type mechanisms.

Figure 7:
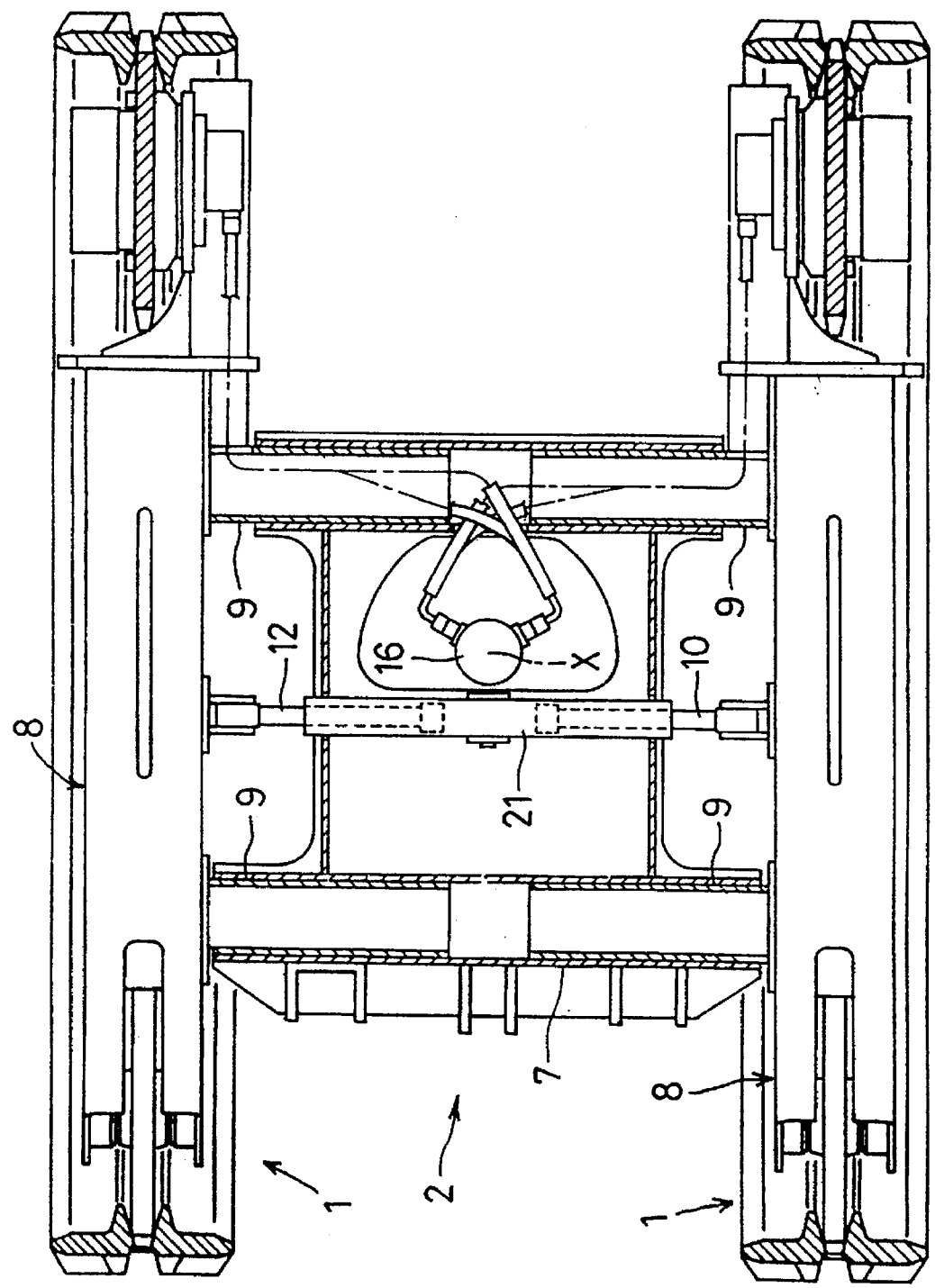
FIG. 7 is a view similar to FIG. 2 and showing a modified construction.

As shown in FIG. 7, the two hydraulic cylinders 10 and 12 may be disposed in two separate, left and right spaces in a cylinder ease 21. This cylinder ease 21 is pivotally connected at a middle point thereof to the chassis frame 2. The hydraulic cylinders 10 and 12 are pivotally connected at outward ends thereof to the track frames 8 of the left and right crawler tracks 1, respectively.

What is claimed is:

1. A backhoe implement having right and left crawler tracks transversely slidable with respect to the backhoe implement, comprising:

a chassis frame;

a swivel deck supported by said chassis frame to be rotatable about a vertical axis (X);

a right crawler side frame transversely slidable relative to said chassis frame and supporting said right crawler track;

a left crawler side frame transversely slidable relative to said chassis frame and supporting said left crawler track; and actuator means for sliding said right and left crawler side frames, wherein when said right and left crawler side frames are at a minimum distance to each other, said swivel deck has a locus of rotation (S) of its peripheries substantially inscribed in outer lateral edges of said right and left crawler tracks.

2. A backhoe implement having right and left crawler tracks transversely slidable with respect to the backhoe implement, comprising:

a chassis frame;

a swivel deck supported by said chassis frame to be rotatable about a vertical axis (X);

a dozer implement supported by said chassis frame, said dozer implement including a main dozer, and right and left auxiliary dozers disposed at opposite ends of said main dozer, respectively, to be transversely slidable relative to said main dozer;

a right crawler side frame transversely slidable relative to said chassis frame and supporting said right crawler track;

a left crawler side frame transversely slidable relative to said chassis frame and supporting said left crawler track;

first actuator means for sliding said right and left crawler side frames;

second actuator means for sliding said right and left auxiliary dozers; and synchronous driving means for synchronously driving said first and second actuator means whereby said right and left auxiliary dozers are slidable synchronously with said right and left crawler side frames, respectively.

3. A backhoe implement as defined in claim 2, wherein said first actuator means includes a right crawler cylinder for said right crawler side frame and a left crawler cylinder for said left crawler side frame, said right and left crawler cylinders are movable independently of each other; and wherein said second actuator means includes a right dozer cylinder for said right auxiliary dozer and a left dozer cylinder for said left auxiliary dozer, said right and left dozer cylinders are movable independently of each other.

4. A backhoe implement as defined in claim 3, wherein said synchronous driving means has cylinder chambers of said right crawler cylinder and said right dozer cylinder interconnected in series, and wherein said synchronous driving means has further cylinder chambers of said left crawler cylinder and said left dozer cylinder interconnected in series.

5. A backhoe implement as defined in claim 2, wherein when said right and left crawler side frames are at a minimum distance to each other, said swivel deck has a locus of rotation (S) of its peripheries substantially inscribed in outer lateral edges of said right and left crawler tracks, and wherein when said right and left auxiliary dozers are at a minimum distance to each other, said swivel deck has a locus of rotation (S) of its peripheries substantially inscribed in outer lateral edges of said right and left auxiliary dozers.

* * * * *